United States Patent
Liu et al.

(10) Patent No.: US 9,780,877 B2
(45) Date of Patent: Oct. 3, 2017

(54) MULTI-STAGE AMPLITUDE MODULATION-BASED METHODS, APPARATUSES AND SYSTEMS FOR CODING AND DECODING VISIBLE LIGHT SIGNAL

(71) Applicant: KUANG-CHI INNOVATIVE TECHNOLOGY LTD., Shenzhen (CN)

(72) Inventors: Ruopeng Liu, Shenzhen (CN); Linyong Fan, Shenzhen (CN)

(73) Assignee: KUANG-CHI INNOVATIVE TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 15/011,558

(22) Filed: Jan. 30, 2016

(65) Prior Publication Data

US 2016/0164604 A1    Jun. 9, 2016

Related U.S. Application Data

(63) Continuation of application No. PCT/CN2014/079405, filed on Jun. 6, 2014.

(30) Foreign Application Priority Data

Jul. 31, 2013   (CN) .......................... 2013 1 0330123

(51) Int. Cl.
    *H04B 10/116*    (2013.01)
(52) U.S. Cl.
    CPC ................. *H04B 10/116* (2013.01)

(58) Field of Classification Search
    CPC .................................................. H04B 10/116
    (Continued)

(56) References Cited

U.S. PATENT DOCUMENTS

2006/0239689 A1* 10/2006 Ashdown ........... H04B 10/1141
                                                          398/130
2009/0208221 A1*  8/2009 Sasai ..................... H04B 1/707
                                                          398/130

(Continued)

FOREIGN PATENT DOCUMENTS

CN    101110741 A    1/2008
CN    102160045 A    8/2011

(Continued)

*Primary Examiner* — Dalzid Singh
(74) *Attorney, Agent, or Firm* — Perkins Coie LLP (57) ABSTRACT

The present application relates to multi-stage amplitude modulation-based methods, apparatuses, and systems for coding and decoding a visible light signal. The coding method includes the following steps: dividing to-be-transmitted information into multiple information units, where each information unit includes multiple bits; converting the multiple information units into multiple electrical signal units indicated by at least three levels, where an interval indicated by a first level in the at least three levels exists between adjacent electrical signal units, and each electrical signal unit uses a combination of other levels in the at least three levels to represent the multiple bits of a corresponding information unit; combining the electrical signal units to obtain a coded electrical signal; and transmitting the coded electrical signal in a visible light signal form.

13 Claims, 6 Drawing Sheets

(58) Field of Classification Search
USPC .......................................................... 398/118
See application file for complete search history.

(56) References Cited

U.S. PATENT DOCUMENTS

| | | | | |
|---|---|---|---|---|
| 2011/0164884 A1* | 7/2011 | Yamada | ............... | H04B 10/116 |
| | | | | 398/172 |
| 2011/0305457 A1* | 12/2011 | Kikuchi | ............. | H04B 10/5055 |
| | | | | 398/65 |
| 2012/0257898 A1* | 10/2012 | Yokoi | ................. | H04L 27/2697 |
| | | | | 398/76 |
| 2015/0305122 A1* | 10/2015 | Saes | ................... | H05B 33/0842 |
| | | | | 315/129 |

FOREIGN PATENT DOCUMENTS

| | | |
|---|---|---|
| CN | 102693567 A | 9/2012 |
| CN | 102694597 A | 9/2012 |
| CN | 103795465 A | 5/2014 |
| WO | 102694598 A | 9/2012 |

\* cited by examiner

MULTI-STAGE AMPLITUDE MODULATION-BASED METHODS, APPARATUSES AND SYSTEMS FOR CODING AND DECODING VISIBLE LIGHT SIGNAL

CROSS REFERENCE TO RELATED APPLICATIONS

This application is a continuation of PCT Application No. PCT/CN2014/079405 filed on Jun. 6, 2014, which claims priority to Chinese Patent Application No. 201310330123.7 of Jul. 31, 2013, all of which are incorporated herein by reference.

TECHNICAL FIELD

The present application relates to visible light communication, and in particular, to multi-stage amplitude modulation-based methods, apparatuses, and systems for coding and decoding a visible light signal.

BACKGROUND

Visible light communication is an emerging short-range high-speed wireless light communications technology that is developed on a basis of LED technology. A basic principle of visible light communication is that communication is performed by flashing an LED light source at a high frequency based on a characteristic that a switching speed of a light emitting diode (LED) is higher than that of a fluorescent lamp and an incandescent lamp. Presence of light represents binary 1, and absence of light represents binary 0. Information may be obtained after a high-speed light signal that includes digital information undergoes photoelectric conversion. In the wireless light communications technology, data is unlikely to be interfered with or captured, and an optical communication device can be easily made and is unlikely to be damaged or degaussed. Therefore, the wireless light communications technology can be used to make a wireless optical encryption key. Compared with microwave technologies, the wireless light communication has abundant spectrum resources, which is incomparable with general microwave communication and wireless communication. In addition, the visible light communication is applicable to any communications protocol, and applicable to any environment. In terms of security, in contrast to conventional magnetic materials, there is no need to worry about a problem of degaussing or even to worry about unlawful interception of communication content; and a wireless optical communication device features flexible and convenient installation and layout, and a low cost, and is applicable to large-scale popularity and application.

With fast promotion of visible light communication, a technology for using an LED (light emitting diode) of an electronic device to transmit a visible light signal is proposed. In the electronic device, a signal duty cycle in turn-on or turn-off of the LED is uncertain, but a duration in which the LED is on and a duration in which the LED is off may be controlled, where on and off may respectively indicate a high level and a low level. Therefore, a specially set coding mode may be used so that the LED transmits a visible light signal representing data information. However, during practice, the inventors of the present application find that a transmission rate (namely, an amount of information transmitted within a unit time) in a conventional method is still low, and that there is still room for improvement.

SUMMARY

A technical problem to be solved by the present application is to provide multi-stage amplitude modulation-based methods, apparatuses, and systems for coding and decoding a visible light signal to improve an information transmission rate of visible light communication based on an LED.

A technical solution used by the present application to solve the foregoing technical problem is to provide a multi-stage amplitude modulation-based method for coding a visible light signal, where the method includes the following steps: dividing to-be-transmitted information into multiple information units, where each information unit includes multiple bits; converting the multiple information units into multiple electrical signal units indicated by at least three levels, where an interval indicated by a first level in the at least three levels exists between adjacent electrical signal units, and each electrical signal unit uses a combination of other levels in the at least three levels to represent the multiple bits of a corresponding information unit; combining the electrical signal units to obtain a coded electrical signal; and transmitting the coded electrical signal in a visible light signal form. In an embodiment of the present application, the step of converting the multiple information units into multiple electrical signal units indicated by at least three levels includes: determining level combinations of the electrical signal units corresponding to the information units according to a preset correspondence table.

In an embodiment of the present application, the method further includes setting a signal end mark to be that a duration of the first level reaches a first threshold.

In an embodiment of the present application, each information unit includes N bits, where N is a natural number, and the information is indicated in binary notation.

In an embodiment of the present application, the step of transmitting the coded electrical signal in a visible light signal form is: using the coded electrical signal to control a light emitting diode, so that the coded electrical signal is transmitted in the visible light signal form, where the light emitting diode is a lamp or is integrated with an electronic device.

In an embodiment of the present application, the first level is an average value of the at least three levels.

In an embodiment of the present application, the first level is not an average value of the at least three levels, and a beginning of the coded electrical signal is the first level.

The present application further provides a multi-stage amplitude modulation-based method for decoding a visible light signal, where the method includes the following steps: receiving a visible light signal and converting it into an electrical signal; when detecting a transition from a first level to other levels, determining that an electrical signal unit begins, and recording a combination of the other levels; when detecting a transition from the other levels to the first level, determining that the electrical signal unit ends, and starting timing; when detecting that a duration of the first level reaches a first threshold, determining that the signal ends; performing decoding to convert each received electrical signal unit into an information unit; and combining multiple information units into information.

In an embodiment of the present application, the step of performing decoding to convert each received electrical signal unit into an information unit is: determining, according to a preset correspondence table, an information unit corresponding to the recorded combination of the other levels of the electrical signal unit.

In an embodiment of the present application, the information is indicated in binary notation.

In an embodiment of the present application, before detecting the transition from the first level to the other levels, the method further includes: obtaining an average level value by performing low-pass filtering, and using the average level value as the first level.

In an embodiment of the present application, before detecting the transition from the first level to the other levels, the method further includes: using a level at a beginning of the electrical signal as the first level.

In an embodiment of the present application, the method further includes: comparing the information with preset information, and if the information matches the preset information, using the information to control a controlled device.

In an embodiment of the present application, that the information matches the preset information includes that the information is the same as or corresponds to the preset information.

The present application further provides a multi-stage amplitude modulation-based apparatus for coding a visible light signal, where the apparatus includes: a module configured to divide to-be-transmitted information into multiple information units, where each information unit includes multiple bits; a module configured to convert the multiple information units into multiple electrical signal units indicated by at least three levels, where an interval indicated by a first level in the at least three levels exists between adjacent electrical signal units, and each electrical signal unit uses a combination of other levels in the at least three levels to represent the multiple bits of a corresponding information unit; a module configured to combine the electrical signal units to obtain a coded electrical signal; and a module configured to transmit the coded electrical signal in a visible light signal form.

In an embodiment of the present application, the module configured to convert the multiple information units into multiple electrical signal units indicated by at least three levels determines level combinations of the electrical signal units corresponding to the information units according to a preset correspondence table.

In an embodiment of the present application, the apparatus further includes a module configured to set a signal end mark to be that a duration of the first level reaches a first threshold.

In an embodiment of the present application, each information unit includes N bits, where N is a natural number, and the information is indicated in binary notation.

In an embodiment of the present application, the module configured to transmit the coded electrical signal in a visible light signal form uses the coded electrical signal to control a light emitting diode, so that the coded electrical signal is transmitted in the visible light signal form, where the light emitting diode is a lamp or is integrated with an electronic device.

In an embodiment of the present application, the first level is an average value of the at least three levels.

In an embodiment of the present application, the first level is not an average value of the at least three levels, and a beginning of the coded electrical signal is the first level.

The present application further provides a multi-stage amplitude modulation-based apparatus for decoding a visible light signal, where the apparatus includes: a module configured to receive a visible light signal and convert it into an electrical signal; a module configured to determine an electrical signal unit begins when a transition from a first level to other levels is detected, and record a combination of the other levels; a module configured to determine the electrical signal unit ends when a transition from the other levels to the first level is detected, and start timing; a module configured to determine the signal ends when it is detected that a duration of the first level reaches a first threshold; a module configured to perform decoding to convert each received electrical signal unit into an information unit; and a module configured to combine multiple information units into information.

In an embodiment of the present application, the module configured to perform decoding to convert each received electrical signal unit into an information unit determines an information unit corresponding to the recorded combination of the other levels of the electrical signal unit according to a preset correspondence table.

In an embodiment of the present application, the information is indicated in binary notation.

In an embodiment of the present application, the apparatus further includes a module configured to obtain, before the transition from the first level to the other levels is detected, an average level value by performing low-pass filtering, and use the average level value as the first level.

In an embodiment of the present application, the apparatus further includes a module configured to use a level at a beginning of the electrical signal as the first level before the transition from the first level to the other levels is detected.

In an embodiment of the present application, the apparatus further includes a module configured to compare the information with preset information, and if the information matches the preset information, use the information to control a controlled device.

In an embodiment of the present application, that the information matches the preset information includes that the information is the same as or corresponds to the preset information.

In an embodiment of the present application, the apparatus is integrated with a controlled end in an access control system.

The present application further provides a photonic key, including the foregoing multi-stage amplitude modulation-based apparatus for coding a visible light signal.

The present application further provides a photonic controlled end, including the foregoing multi-stage amplitude modulation-based apparatus for decoding a visible light signal.

The present application further provides an authentication system, including the foregoing photonic key and photonic controlled end.

The present application further provides an authentication system, including the foregoing multi-stage amplitude modulation-based apparatus for coding a visible light signal and the foregoing multi-stage amplitude modulation-based apparatus for decoding a visible light signal. In the foregoing technical solution of the present application, in comparison with the prior art, because level transitions rather than level durations are used to represent information, synchronization that is hardly achievable for an LED does not need to be maintained between a transmit end and a receive end. In addition, information density is improved by information grouping and multi-stage amplitude modulation, and therefore a problem of transmission rate reduction caused by a flashing delay is solved.

BRIEF DESCRIPTION OF DRAWINGS

The accompanying drawings constituting a part of the present application are used to provide a further understanding about the present application. Exemplary embodiments of the present application and descriptions thereof are used to explain the present application, but do not constitute any inappropriate limitation on the present application.

DESCRIPTION OF EMBODIMENTS

It should be noted that the embodiments in the present application and features in the embodiments may be combined with each other in a case of no conflict. The following describes the present application in detail with reference to the accompanying drawings and embodiments.

In brief, the embodiments of the present application provide a method for coding and decoding a visible light signal, which may improve an information transmission rate of visible light communication based on an LED.

After further research, it is found that a cause of a low transmission rate of visible light communication based on an LED is that there is a delay in controlling flashing of the LED, that is, durations of on and off states are always longer than an expected set value. A direct result of this phenomenon is that a time longer than expected is always needed by the LED to propagate data with a same length. In addition, the delay in controlling flashing makes it difficult to perform synchronization between a transmit end and a receive end. According to a conventional technology, communication is performed by flashing an LED at a high frequency, where presence of light represents binary 1, and absence of light represents binary 0. However, due to lack of accurate synchronization, if presence of light and absence of light are respectively used to represent binary 1 and 0, a bit reception error may occur. For example, when a duration representing a binary bit 0 in a state of absence of light exceeds a set value, an excess of the duration is identified as another binary bit 0.

Because the LED has the foregoing disadvantage, it is necessary to provide a new coding and decoding method. According to the embodiments of the present application, from a perspective of an electrical signal, a combination of multi-stage levels is used to represent information. From a perspective of a light signal, luminance of light is used to represent information.

Therefore, during coding, to-be-transmitted information may be divided into multiple information units, where each information unit includes multiple bits. Then the information units are converted into multiple electrical signal units. The electrical signal units are represented by at least three levels. A first level in the at least three levels is set as a reference level. The first level is used to indicate an interval between adjacent electrical signal units. Other levels in the at least three levels are mutually combined in the electrical signal units to represent the multiple bits. Afterward, the electrical signal units are combined to obtain a coded electrical signal.

For the entire electrical signal, a signal end mark is set to be that a duration of the first level reaches a first threshold.

After an expected electrical signal is obtained, the electrical signal is used to control a light emitting diode, and is transmitted by the light emitting diode in a visible light signal form.

At a receive end, a decoding process is reverse. The receive end receives a visible light signal and converts it into an electrical signal. When detecting a transition from a first level to other levels, it is determined that an electrical signal unit begins, and a combination of the other levels is recorded. When a transition from the other levels to the first level is detected, it is determined that the electrical signal unit ends, and timing is started. When it is detected that a duration of the first level reaches a first threshold, it is determined that the signal ends. Then decoding is performed to convert each received electrical signal unit into an information unit; and multiple information units are combined into original information.

The first level used as a reference level needs to be determined accurately beforehand, so that it is used as a reference for the other levels. The other levels are level values relative to the reference level. The first level may be set as an average value of multiple levels in an electrical signal unit, or may not be set as an average value of the levels. If the average value is used as the first level, the transmit end does not need to perform special processing; the receive end may perform low-pass filtering to obtain an average value and use the average value as the first level. If the average value is not used as the first level, the transmit end may firstly transmit a segment of the first level at the beginning during coding; after reading a light signal of the first level, the receive end uses a level that undergoes photoelectric conversion as the first level. Certainly, whether the average level value is used as the first level needs to be determined beforehand between the transmit end and the receive end.

An advantage of the coding mode of the present application lies in that level transitions rather than level durations are used to represent information, and therefore synchronization that is hardly achievable for an LED does not need to be maintained between the transmit end and the receive end. In addition, information density is improved by information grouping and multi-stage amplitude modulation, and therefore a problem of transmission rate reduction caused by a flashing delay is solved.

The present application to be protected is hereinafter described with reference to the accompanying drawings, and in all the accompanying drawings, same reference numbers are used to indicate same components or steps. In the following description, for the purpose of explanation, multitudinous specific details are disclosed to provide a comprehensive understanding about the subject matter to be protected. However, apparently, the present application may also be implemented without using these specific details.

Embodiment 1

Figure 1:
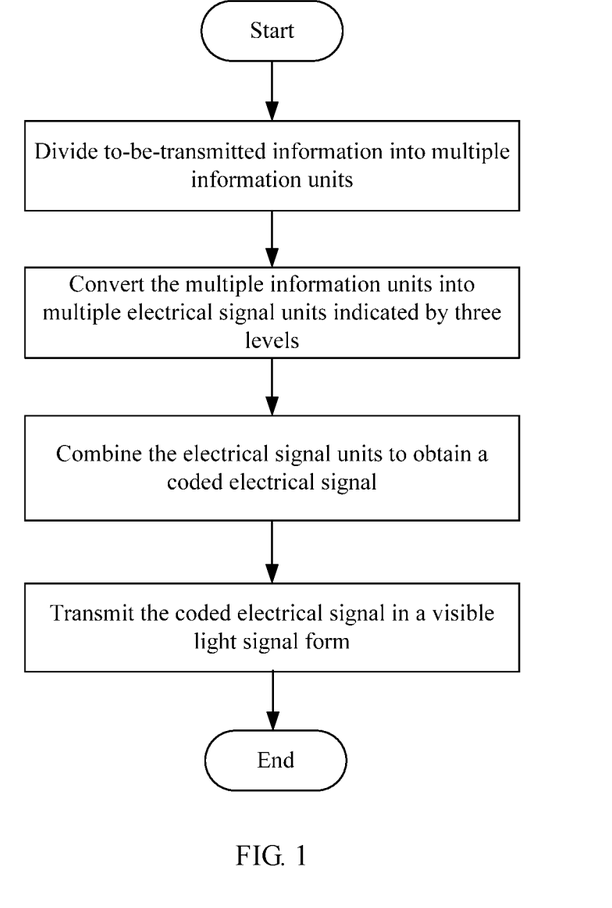
FIG. 1 shows a flowchart of a method for coding a visible light signal according to Embodiment 1 of the present application.

Referring to FIG. 1, FIG. 1 is a flowchart of a method for coding a visible light signal according to Embodiment 1 of the present application. The coding method includes:

Step 101: Divide to-be-transmitted information into multiple information units.

Original information may be indicated in binary notation. Each information unit includes multiple bits (bit). For example, each information unit includes 2 bits.

Step 102: Convert the multiple information units into multiple electrical signal units.

In this embodiment, the electrical signal units are indicated by three levels, for example, 0V, 1V, and 2V. A first level, such as 0V, is set as a reference level for indicating an interval between adjacent electrical signal units. The other two levels, such as 1V and 2V, are mutually combined in the electrical signal unit to represent 2 bits. Specifically, in an electrical signal unit, a level transition from 0V to 1V and then from 1V to 0V represents information 00; a level transition from 0V to 2V and then from 2V to 0V represents information 01; a level transition from 0V to 1V, then from 1V to 2V, and then from 2V to 0 represents information 10; a level transition from 0V to 2V, then from 2V to 1V, and then from 1V to 0V represents information 11. A correspondence between combination of different levels and information represented by the combination is shown in Table 1.

TABLE 1

| Level combination | 1 | 2 | 12 | 21 |
|---|---|---|---|---|
| Signal (2 bits) | 00 | 01 | 10 | 11 |

Each electrical signal indicates 2-bit information, and information of four electrical signal units constitutes one byte.

Therefore, a level combination of an electrical signal unit corresponding to an information unit may be determined according to the foregoing preset correspondence table.

In this embodiment, a rising edge of a level may be used as a start of a transition.

It may also be seen from the foregoing table that even a bit value 00 is indicated by a level transition from 0V to 1V and then from 1V to 0V. In the transition manner, in comparison with a level duration manner, a delay does not easily cause a detection error.

One of the three levels may be specified freely as the first level. Specific values of the three levels may also be set flexibly, for example, set to 1V, 2V, and 3V. Specific information represented by the level combination may be set flexibly. For example, a level combination 1 indicates information 01; a level combination 2 indicates information 00; a level combination 12 indicates information 10; a level combination 21 indicates information 11.

Step 103: Combine the electrical signal units to obtain a coded electrical signal.

Figure 3:
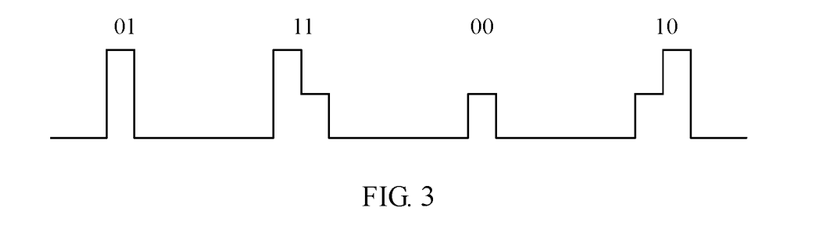
FIG. 3 shows an exemplary coded electrical signal in visible light communication according to Embodiment 1 of the present application.

FIG. 3 shows a schematic diagram of a relationship between signal and level. In the figure, four groups of signals represent 01, 11, 00, and 10 respectively; a level 0V is used to distinguish between two adjacent groups of signals; a signal after combination is one byte, and is indicated as 01110010 in binary notation.

In addition, an end mark of the entire electrical signal may be set to be that a duration of the first level reaches a first threshold, for example, 60 ms.

In this embodiment, 0V is specified as the reference level, and is not an average value of the three levels. Therefore, as shown in FIG. 3, the reference level 0V is firstly transmitted at the beginning of the entire electrical signal, and is used as a reference for the other levels. Step 104: Transmit the coded electrical signal in a visible light signal form.

Herein, the coded electrical signal is used to control a light emitting diode, so that the coded electrical signal is transmitted in the visible light signal form. In this embodiment, the light emitting diode may be integrated with an electronic device such as a mobile phone, a tablet computer, a notebook computer, a digital camera, an MP3 player, or an MP4 player. The light emitting diode may also be an independent apparatus, for example, a lamp. Visible light emitted by the lamp may be modulated by a control apparatus and thereby carries a signal.

Figure 2:
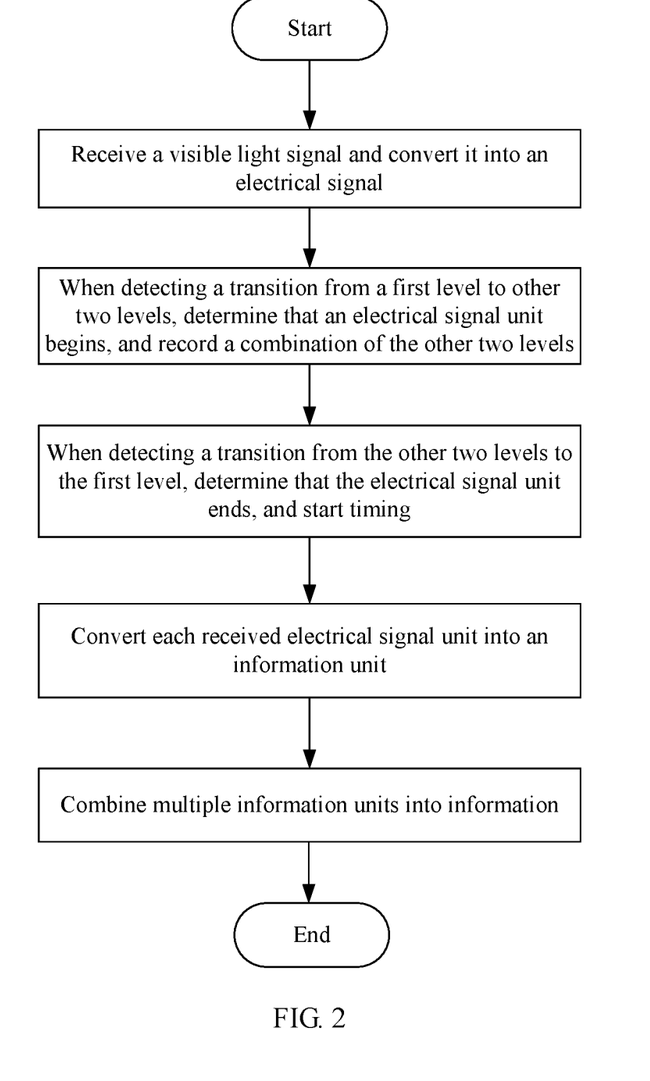
FIG. 2 shows a flowchart of a method for decoding a visible light signal according to Embodiment 1 of the present application.

Referring to FIG. 2, FIG. 2 is a flowchart of a method for decoding a visible light signal according to Embodiment 1 of the present application. The decoding method includes:

Step 201: Receive a visible light signal and convert it into an electrical signal. During reception, an optical receiver of a receive end needs to be aimed at an LED emitter of a transmit end.

Step 202: When detecting a transition from a first level to other two levels, determine that an electrical signal unit begins, and record a combination of the other levels.

For example, when a transition from 0V to 1V or 2V is detected, it is determined that the electrical signal unit begins. Herein a rising edge from 0V to 1V or 2V may be used as a start of the transition.

Before the transition from the first level to the other two levels is detected, it is necessary to firstly determine the first level. Therefore, once the receive end begins to read a light signal, the receive end uses a level that undergoes photoelectric conversion as the first level 0V.

In each electrical signal unit, transitions between the other levels may be recorded. For example, a level transition from 1V to 2V indicates a combination of levels 1V and 2V, and this may be considered to represent an information unit 10; a level transition from 2V to 1V indicates a combination of levels 2V and 1V, and this may be considered to represent an information unit 11. As shown in Table 1, electrical signal units corresponding to the information unit 00 and information unit 01 are indicated by a single level.

Step 203: When detecting a transition from the other two levels to the first level, determine that the electrical signal unit ends, and start timing. For example, a level transition from 1V or 2V to 0V may be considered to be that the electrical signal unit ends. Information represented by the electrical signal unit may be determined jointly by a level value detected when the electrical signal unit begins and a level transition detected in the electrical signal unit.

Step 204: When detecting that a duration of the first level reaches a first threshold, determine that the signal ends.

For example, if a duration of the level 0V is greater than 60 ms, it is considered that the entire electrical signal ends.

In another case, that the duration of the first level reaches a first threshold such as 60 ms may also represent signal interruption and restart of signal detection.

In the embodiment of the present application, the process of conversion from the light signal to the electrical signal and decoding may be implemented in a light signal reception process in a streamline mode. That is, conversion and decoding are performed when a part of the light signal is received each time. When it is determined that the electrical signal ends, it means that reception of the light signal is complete.

Step 205: Perform decoding to convert each received electrical signal unit into an information unit.

The conversion process may be completed by referring to the correspondence between level combination and bit value combination in Table 1.

Step 206: Combine multiple information units into information, and thereby obtain information represented by the visible light signal.

In the coding and decoding modes provided by this embodiment, information is divided into several groups of signals, and three levels 0V, 1V, and 2V are set, where the level 0V is used to distinguish between the groups of signals. In a group of signals, a combination of the other two levels 1V and 2V is used to indicate information. The signal is transmitted by an LED in a visible light form. A receive end determines, by using the level 0V for distinguishing between electrical signal units, that reception of an electrical signal unit ends, or that reception is interrupted, or that reception is complete, and records a combination of the other two levels that represents information in an electrical signal unit. Therefore, by using this embodiment, communication between the transmit end and the receive end of a visible light signal may be implemented, and thereby user experience is improved.

Embodiment 2

Figure 4:
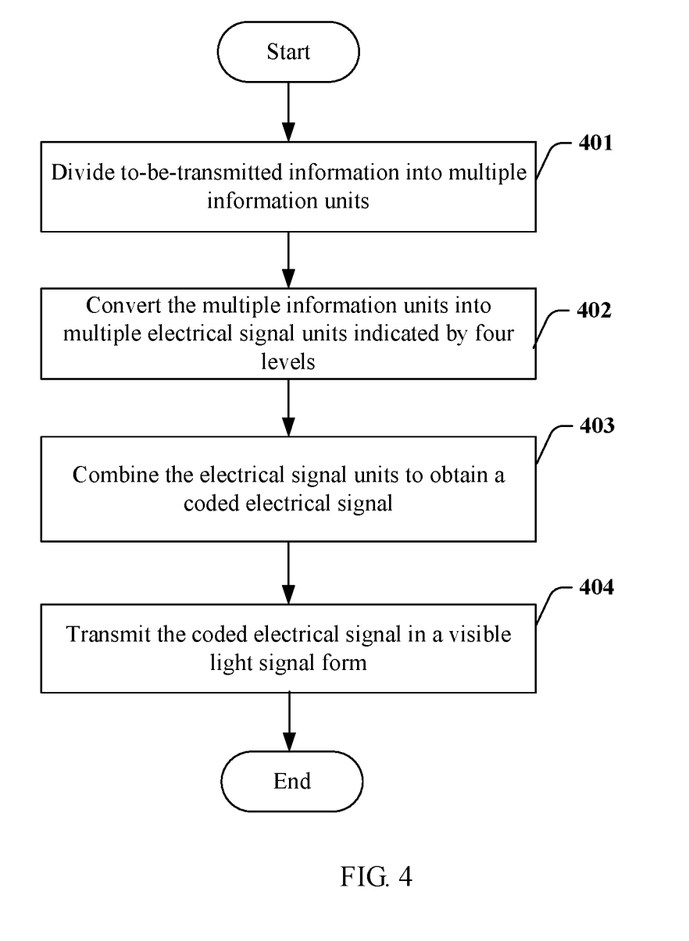
FIG. 4 shows a flowchart of a method for coding a visible light signal according to Embodiment 2 of the present application.

Referring to FIG. 4, FIG. 4 is a flowchart of a method for coding a visible light signal according to Embodiment 2 of the present application. The coding method includes:

Step 401: Divide to-be-transmitted information into multiple information units.

Original information may be indicated in binary notation. Each information unit includes multiple bits (bit). For example, each information unit includes 4 bits.

Step 402: Convert the multiple information units into multiple electrical signal units.

In this embodiment, the electrical signal units are indicated by four levels, for example, 0V, 1V, 2V, and 3V. A first level, such as 0V, is set as a reference level for indicating an interval between adjacent electrical signal units. The other three levels, such as 1V, 2V, and 3V, are mutually combined in the electrical signal unit to represent 3 bits.

For example, in an electrical signal unit, a level transition from 0V to 1V and then from 1V to 0V represents information 0000; a level transition from 0V to 2V and then from 2V to 0V represents information 0001; a level transition from 0V to 1V, then from 1V to 2V, and then from 2V to 0 represents information 0011; a level transition from 0V to 2V, then from 2V to 1V, and then from 1V to 0V represents information 1001. A correspondence between combination of different levels and information represented by the combination is shown in Table 2.

TABLE 2

| Level combination | 1 | 2 | 3 |
|---|---|---|---|
| Information (4 bits) | 0000 | 0001 | 0010 |
| Level combination | 12 | 121 | 123 |
| Information (4 bits) | 0011 | 0100 | 0101 |
| Level combination | 13 | 131 | 132 |
| Information (4 bits) | 0110 | 0111 | 1000 |
| Level combination | 21 | 212 | 213 |
| Information (4 bits) | 1001 | 1010 | 1011 |
| Level combination | 23 | 231 | 232 |
| Information (4 bits) | 1100 | 1101 | 1110 |
| Level combination | 31 | 312 | 313 |
| Information (4 bits) | 1111 | — | — |
| Level combination | 32 | 321 | 323 |
| Information (4 bits) | — | — | — |

In this embodiment, a rising edge of a level may be used as a start of a transition.

It may also be seen from the foregoing table that, any combination of bit values includes at least one level transition. In the transition manner, in comparison with a level duration manner, a delay does not easily cause a detection error.

One of the four levels may be specified freely as the first level. For example, 1V is specified as the first level. Specific values of the four levels may also be set flexibly, for example, set to 1V, 2V, 3V, and 4V. Specific information represented by the level combination may also be set flexibly. For example, a level combination 1 indicates information 0001; a level combination 2 indicates information 0010; a level combination 3 indicates information 0000.

Step 403: Combine the electrical signal units to obtain a coded electrical signal.

Figure 6:
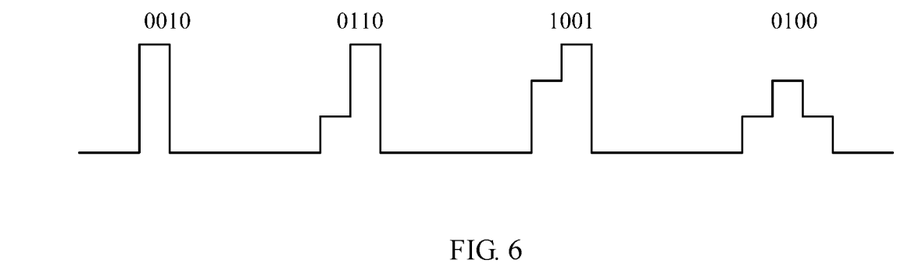
FIG. 6 shows an exemplary coded electrical signal in visible light communication according to Embodiment 2 of the present application.

FIG. 6 shows a schematic diagram of a relationship between signal and level. In the figure, four electrical signal units represent 0010, 0110, 1001, and 0100 respectively; a level 0 is used to distinguish between two adjacent groups of signals; a signal after combination is indicated as 0010011010010100 in binary notation.

In addition, an end mark of the entire electrical signal may be set to be that a duration of the first level reaches a first threshold, for example, 60 ms.

In this embodiment, 0V is specified as the reference level, and is not an average value of the three levels. Therefore, as shown in FIG. 6, the reference level 0V is firstly transmitted at the beginning of the entire electrical signal, and is used as a reference for the other levels.

Step 404: Transmit the coded electrical signal in a visible light signal form.

Herein, the coded electrical signal is used to control a light emitting diode, so that the coded electrical signal is transmitted in the visible light signal form.

In this embodiment, the light emitting diode may be integrated with an electronic device such as a mobile phone, a tablet computer, a notebook computer, a digital camera, an MP3 player, or an MP4 player. The light emitting diode may also be an independent apparatus, for example, a lamp. Visible light emitted by the lamp may be modulated by a control apparatus and thereby carries a signal.

Figure 5:
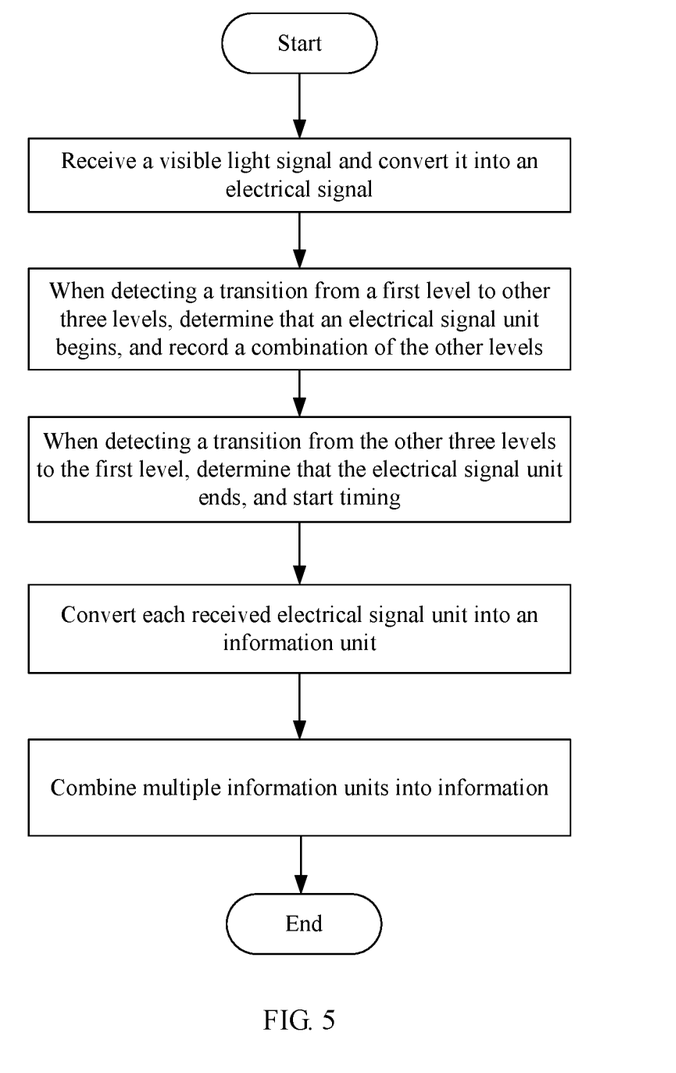
FIG. 5 shows a flowchart of a method for decoding a visible light signal according to Embodiment 2 of the present application.

Referring to FIG. 5, FIG. 5 is a flowchart of a method for decoding a visible light signal according to Embodiment 2 of the present application. The decoding method includes:

Step 501: Receive a visible light signal and convert it into an electrical signal. During reception, an optical receiver of a receive end needs to be aimed at an LED emitter of a transmit end.

Step 502: When detecting a transition from a first level to other three levels, determine that an electrical signal unit begins, and record a combination of the other three levels.

For example, when a transition from 0V to 1V, 2V, or 3V is detected, it is determined that the electrical signal unit begins. Herein a rising edge from 0V to 1V, 2V, or 3V may be used as a start of the transition.

In each electrical signal unit, transitions between other levels may be recorded. For example, a level transition from 1V to 2V indicates a combination of levels 1V and 2V, and this may be considered to represent an information unit 0011; a level transition from 2V to 1V indicates a combination of levels 2V and 1V, and this may be considered to represent an information unit 1001.

Step 503: When detecting a transition from the other three levels to the first level, determine that the electrical signal unit ends, and start timing.

For example, a level transition from 1V, 2V, or 3V to 0V may be considered to be that the electrical signal unit ends. Information represented by the electrical signal unit may be determined jointly by a level value detected when the electrical signal unit begins and a level transition detected in the electrical signal unit.

Before the transition from the first level to the other three levels is detected, it is necessary to firstly determine the first level 0V. Therefore, once the receive end begins to read a light signal, the receive end uses a level that undergoes photoelectric conversion as the first level.

Step 504: When detecting that a duration of the first level reaches a first threshold, determine that the signal ends. For example, if a duration of the level 0V is greater than 60 ms, it is considered that the entire electrical signal ends.

In another case, that the duration of the first level reaches a first threshold such as 60 ms may also represent signal interruption and restart of signal detection.

In the embodiment of the present application, the process of conversion from the light signal to the electrical signal and decoding may be implemented in a light signal reception process in a streamline mode. That is, conversion and decoding are performed when a part of the light signal is received each time. When it is determined that the electrical signal ends, it means that reception of the light signal is complete.

Step 505: Perform decoding to convert each received electrical signal unit into an information unit.

The conversion process may be completed by referring to the correspondence between level combination and bit value combination of information units in Table 2.

Step 506: Combine multiple information units into information, and thereby obtain information represented by the visible light signal.

In the coding and decoding modes provided by this embodiment, information is divided into several groups of signals, and four levels 0V, 1V, 2V, and 3V are set, where the level 0V is used to distinguish between the groups of signals. In a group of signals, a combination of the other three levels 1V, 2V, and 3V is used to indicate information. The signal is transmitted by an LED in a visible light form. A receive end determines, by using the level 0V for distinguishing between electrical signal units, that reception of an electrical signal unit ends, or that reception is interrupted, or that reception is complete, and records a combination of the other three levels that represents information in an electrical signal unit. Therefore, by using this embodiment, communication between the transmit end and the receive end of a visible light signal may be implemented, and thereby user experience is improved.

Embodiment 3

This embodiment is implemented in a photonic access control system, where a portable electronic device such as a mobile phone may be used as a transmit end, while an access control end is used as a receive end. The access control end decodes a signal, and may further perform matching by using the signal, and thereby determine whether to open a door.

Figure 7:
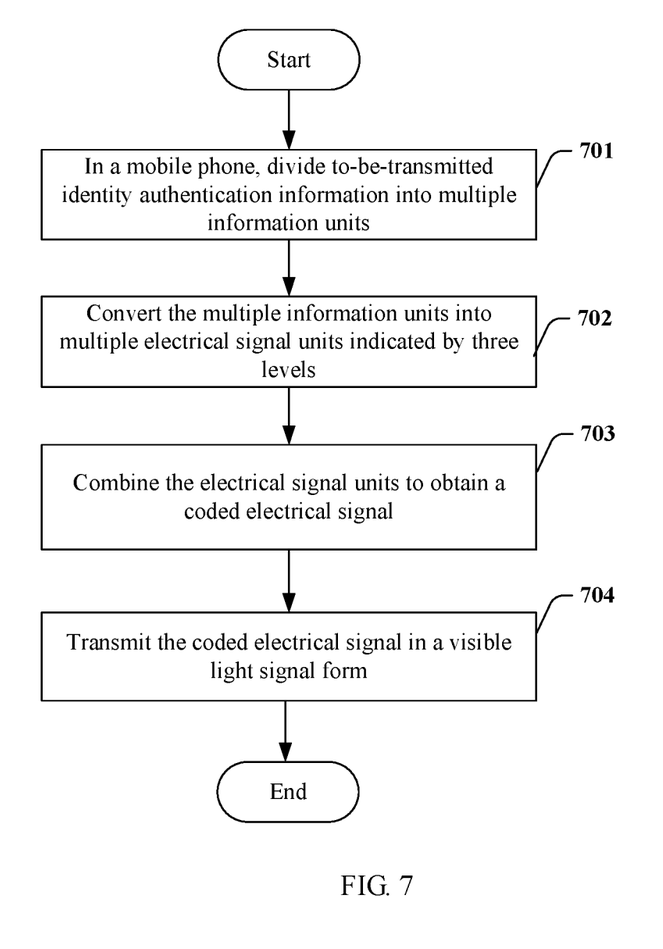
FIG. 7 shows a flowchart of a method for coding a visible light signal according to Embodiment 3 of the present application.

Referring to FIG. 7, FIG. 7 is a flowchart of a method for coding a visible light signal according to Embodiment 3 of the present application. The coding method includes:

Step 701: In a mobile phone, divide to-be-transmitted identity authentication information into multiple information units.

Original identity authentication information may be indicated in binary notation. Each information unit includes multiple bits (bit). For example, each information unit includes 2 bits.

Step 702: Convert the multiple information units into multiple electrical signal units indicated by three levels.

In this embodiment, the electrical signal units are indicated by three levels, for example, 0V, 1V, and 2V. A first level, such as 0V, is set as a reference level for indicating an interval between adjacent electrical signal units. The other two levels, such as 1V and 2V, are mutually combined in the electrical signal unit to represent 2 bits.

Specifically, in an electrical signal unit, a level transition from 0V to 1V and then from 1V to 0V represents information 00; a level transition from 0V to 2V and then from 2V to 0V represents information 01; a level transition from 0V to 1V, then from 1V to 2V, and then from 2V to 0 represents information 10; a level transition from 0V to 2V, then from 2V to 1V, and then from 1V to 0V represents information 11. A correspondence between combination of different levels and information represented by the combination is shown in Table 1.

Each electrical signal indicates 2-bit information, and information of four electrical signal units constitutes one byte.

In this embodiment, a rising edge of a level may be used as a start of a transition.

It may also be seen from Table 1 that even a bit value 00 is indicated by a level transition from 0V to 1V and then from 1V to 0V. In the transition manner, in comparison with a level duration manner, a delay does not easily cause a detection error.

Step 703: Combine the electrical signal units to obtain a coded electrical signal.

In addition, an end mark of the entire electrical signal may be set to be that a duration of the first level reaches a first threshold, for example, 60 ms.

Step 704: Transmit the coded electrical signal in a visible light signal form. Herein, the coded electrical signal is used to control a light emitting diode, so that the coded electrical signal is transmitted in the visible light signal form. During transmission, an LED emitter of the mobile phone needs to be aimed at an optical receiver of a controlled end in a photonic access control system.

Figure 8:
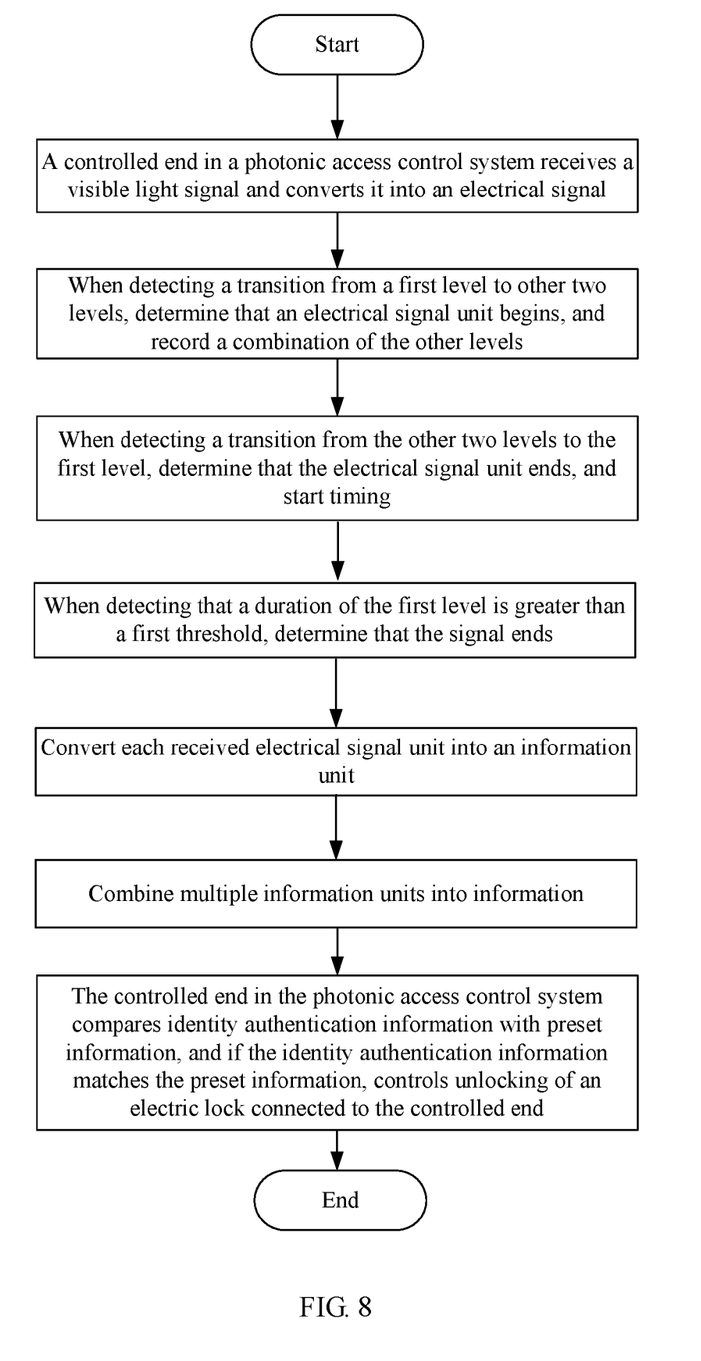
FIG. 8 shows a flowchart of a method for decoding a visible light signal according to Embodiment 3 of the present application.

Referring to FIG. 8, FIG. 8 is a flowchart of a method for decoding a visible light signal according to Embodiment 3 of the present application. The decoding method includes:

Step 801: A controlled end in a photonic access control system receives a visible light signal and converts it into an electrical signal.

Step 802: When detecting a transition from a first level to other two levels, determine that an electrical signal unit begins, and record a combination of the other levels.

For example, when a transition from 0V to 1V or 2V is detected, it is determined that the electrical signal unit begins. Herein a rising edge from 0V to 1V or 2V may be used as a start of the transition.

In each electrical signal unit, transitions between the other levels may be recorded. For example, a level transition from 1V to 2V indicates a combination of levels 1V and 2V, and this may be considered to represent an information unit 10; a level transition from 2V to 1V indicates a combination of levels 2V and 1V, and this may be considered to represent an information unit 11. As shown in Table 1, electrical signal units corresponding to the information unit 00 and information unit 01 are indicated by a single level.

Step 803: When detecting a transition from the other two levels to the first level, determine that the electrical signal unit ends, and start timing. For example, a level transition from 1V or 2V to 0V may be considered to be that the electrical signal unit ends. Information represented by the electrical signal unit may be determined jointly by a level value detected when the electrical signal unit begins and a level transition detected in the electrical signal unit.

Step 804: When detecting that a duration of the first level reaches a first threshold, determine that the signal ends.

For example, if a duration of the level 0V reaches 60 ms, it is considered that the entire electrical signal ends.

In another case, that the duration of the first level reaches a first threshold such as 60 ms may also represent signal interruption and restart of signal detection.

In the embodiment of the present application, the process of conversion from the light signal to the electrical signal and decoding may be implemented in a light signal reception process in a streamline mode. That is, conversion and decoding are performed when a part of the light signal is received each time. When it is determined that the electrical signal ends, it means that reception of the light signal is complete.

Step 805: Perform decoding to convert each received electrical signal unit into an information unit.

The conversion process may be completed by referring to the correspondence between level combination and bit value combination of information units in Table 1.

Step 806: Combine multiple information units into information, and thereby obtain information represented by the visible light signal.

Step 807: The controlled end in the photonic access control system compares identity authentication information with preset information, and if the identity authentication information matches the preset information, controls unlocking of an electric lock connected to the controlled end.

In this embodiment, that the identity authentication information matches the preset information includes that the identity authentication information is the same as or corresponds to the preset information.

In the coding and decoding modes provided by this embodiment, information is divided into several groups of signals, and three levels 0V, 1V, and 2V are set, where the level 0V is used to distinguish between the groups of signals. In a group of signals, a combination of the other two levels 1V and 2V is used to indicate information. The signal is transmitted by an LED in a visible light form. A receive end determines, by using the level 0V for distinguishing between electrical signal units, that reception of an electrical signal unit ends, or that reception is interrupted, or that reception is complete, and records a combination of the other two levels that represents information in an electrical signal unit. Therefore, by using this embodiment, communication between a mobile phone that is used as a photonic lock of a photonic access control system and a controlled end of the access control system may be implemented, and thereby user experience is improved.

The present application further provides a multi-stage amplitude modulation-based apparatus for coding a visible light signal, where the apparatus includes: a module configured to divide to-be-transmitted information into multiple information units, where each information unit includes multiple bits; a module configured to convert the multiple information units into multiple electrical signal units indicated by at least three levels, where an interval indicated by a first level in the at least three levels exists between adjacent electrical signal units, and each electrical signal unit uses a combination of other levels in the at least three levels to represent the multiple bits of a corresponding information unit; a module configured to combine the electrical signal units to obtain a coded electrical signal; and a module configured to transmit the coded electrical signal in a visible light signal form.

The module configured to convert the multiple information units into multiple electrical signal units indicated by at least three levels determines, according to a preset correspondence table, level combinations of the electrical signal units corresponding to the information units.

The apparatus further includes a module configured to set a signal end mark to be that a duration of the first level reaches a first threshold.

Each information unit includes N bits, where N is a natural number, and the information is indicated in binary notation.

The module configured to transmit the coded electrical signal in a visible light signal form uses the coded electrical signal to control a light emitting diode, so that the coded electrical signal is transmitted in the visible light signal form, where the light emitting diode is a lamp or is integrated with an electronic device.

The first level is an average value of the at least three levels.

The first level may also not be an average value of the at least three levels, and a beginning of the coded electrical signal is the first level.

The present application further provides a multi-stage amplitude modulation-based apparatus for decoding a visible light signal, where the apparatus includes: a module configured to receive a visible light signal and convert it into an electrical signal; a module configured to determine, when a transition from a first level to other levels is detected, that an electrical signal unit begins, and record a combination of the other levels; a module configured to determine, when a transition from the other levels to the first level is detected, that the electrical signal unit ends, and start timing; a module configured to determine, when it is detected that a duration of the first level reaches a first threshold, that the signal ends; a module configured to perform decoding to convert each received electrical signal unit into an information unit; and a module configured to combine multiple information units into information.

The module configured to perform decoding to convert each received electrical signal unit into an information unit determines, according to a preset correspondence table, an information unit corresponding to the recorded combination of the other levels of the electrical signal unit.

The information is indicated in binary notation.

The apparatus further includes a module configured to obtain, before the transition from the first level to the other levels is detected, an average level value by performing low-pass filtering, and use the average level value as the first level.

The apparatus further includes a module configured to use a level at a beginning of the electrical signal as the first level before the transition from the first level to the other levels is detected.

The apparatus further includes a module configured to compare the information with preset information, and if the information matches the preset information, use the information to control a controlled device.

That the information matches the preset information includes that the information is the same as or corresponds to the preset information.

The apparatus is integrated with a controlled end in an access control system.

The present application further provides an authentication system, where the authentication system may be an access control system, a metro system, a payment system, or a consumption management system. The authentication system includes a photonic key and a photonic controlled end. The photonic key includes the foregoing multi-stage amplitude modulation-based apparatus for coding a visible light signal, and the photonic controlled end includes the foregoing multi-stage amplitude modulation-based apparatus for decoding a visible light signal. Using the access control system as an example, in this embodiment, the photonic key is used as a transmit end, and coded identification data is transmitted in a visible light signal form by using an LED of the photonic key. The photonic controlled end decodes the visible light signal received from the photonic key, then performs authentication according to the identification data obtained by decoding, and if information is matched and the authentication is passed, controls unlocking of a controllable lock connected to the photonic controlled end. Thereby, unlocking is implemented, and user experience is improved. The lock may also be replaced with any other access control switch apparatus capable of switching between an on state and an off state, for example, a gate.

The present application further provides an authentication system, including the foregoing multi-stage amplitude modulation-based apparatus for coding a visible light signal and the foregoing multi-stage amplitude modulation-based apparatus for decoding a visible light signal.

The foregoing descriptions are merely exemplary embodiments of the present application, but are not intended to limit the present application. Persons skilled in the art understand that the present application may have various modifications and variations. Any modification, equivalent replacement, and improvement made without departing from the spirit and principle of the present application shall fall within the protection scope of the present application.

What is claimed is:

1. A multi-stage amplitude modulation-based method for coding a visible light signal, comprising the following steps:
   dividing to-be-transmitted information into multiple information units, each information unit comprises multiple bits;
   converting the multiple information units into multiple electrical signal units indicated by at least three levels, an interval indicated by a first level in the at least three levels exists between adjacent electrical signal units, and each electrical signal unit uses a combination of other levels in the at least three levels to represent the multiple bits of a corresponding information unit;
   combining the electrical signal units to obtain a coded electrical signal; and
   transmitting the coded electrical signal in a visible light signal form.

2. The method according to claim 1, wherein the step of converting the multiple information units into multiple electrical signal units indicated by at least three levels comprises: determining level combinations of the electrical signal units corresponding to the information units according to a preset correspondence table.

3. The method according to claim 1, further comprising setting a signal end mark to be that a duration of the first level reaches a first threshold.

4. The method according to claim 1, wherein each information unit comprises N bits, wherein N is a natural number, and the information is indicated in binary notation.

5. The method according to claim 1, wherein the step of transmitting the coded electrical signal in a visible light signal form is: using the coded electrical signal to control a light emitting diode, so that the coded electrical signal is transmitted in the visible light signal form, where the light emitting diode is a lamp or is integrated with an electronic device.

6. The method according to claim 1, wherein the first level is an average value of the at least three levels.

7. The method according to claim 1, wherein the first level is not an average value of the at least three levels, and a beginning of the coded electrical signal is the first level.

8. A multi-stage amplitude modulation-based method for decoding a visible light signal, comprising the following steps:
   receiving a visible light signal and converting it into an electrical signal;
   when detecting a transition from a first level to other levels, determining that an electrical signal unit begins, and recording a combination of the other levels;
   when detecting a transition from the other levels to the first level, determining that the electrical signal unit ends, and starting timing;
   when detecting that a duration of the first level reaches a first threshold, determining that the signal ends;
   performing decoding to convert each received electrical signal unit into an information unit; and
   combining multiple information units into information.

9. The method according to claim 8, wherein the step of performing decoding to convert each received electrical signal unit into an information unit is: determining, according to a preset correspondence table, an information unit corresponding to the recorded combination of the other levels of the electrical signal unit.

10. The method according to claim 8, wherein before detecting the transition from the first level to the other levels, the method further comprises: obtaining an average level value by performing low-pass filtering, and using the average level value as the first level.

11. The method according to claim 8, wherein before detecting the transition from the first level to the other levels, the method further comprises: using a level at a beginning of the electrical signal as the first level.

12. The method according to claim 8, further comprising: comparing the information with preset information, and if the information matches the preset information, using the information to control a controlled device.

13. The method according to claim 12, wherein that the information matches the preset information comprises that the information is the same as or corresponds to the preset information.

* * * * *